US009036576B2

(12) United States Patent
Lee et al.

(10) Patent No.: US 9,036,576 B2
(45) Date of Patent: May 19, 2015

(54) METHOD AND APPARATUS FOR PERFORMING RANDOM ACCESS PROCEDURES IN A WIRELESS COMMUNICATION SYSTEM

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 266 days.

(21) Appl. No.: 13/695,621

(22) PCT Filed: Apr. 27, 2011

(86) PCT No.: PCT/KR2011/003082
§ 371 (c)(1),
(2), (4) Date: Nov. 1, 2012

(87) PCT Pub. No.: WO2011/139043
PCT Pub. Date: Nov. 10, 2011

(65) Prior Publication Data
US 2013/0058301 A1 Mar. 7, 2013

Related U.S. Application Data

(60) Provisional application No. 61/330,388, filed on May 2, 2010, provisional application No. 61/471,664, filed on Apr. 4, 2011.

(51) Int. Cl.
*H04W 74/00* (2009.01)
*H04L 1/18* (2006.01)
*H04W 74/08* (2009.01)

(52) U.S. Cl.
CPC ........... *H04L 1/1877* (2013.01); *H04W 74/002* (2013.01); *H04W 74/0833* (2013.01)

(58) Field of Classification Search
CPC ...... H04W 24/00; H04W 52/46; H04W 80/04; H04W 72/04; H04L 1/1877; H04L 5/0053; H04W 74/002; H04J 1/00; H04B 7/2606
USPC ................................... 370/252, 318, 328, 329
See application file for complete search history.

(56) References Cited

U.S. PATENT DOCUMENTS

| 7,865,209 B2 | 1/2011 | Kim et al. | |
|---|---|---|---|
| 2007/0115872 A1* | 5/2007 | Kim et al. | 370/318 |
| 2010/0238831 A1* | 9/2010 | Jeong et al. | 370/252 |
| 2013/0100895 A1* | 4/2013 | Aghili et al. | 370/329 |

FOREIGN PATENT DOCUMENTS

| CN | 101064728 A | 10/2007 |
|---|---|---|
| CN | 101662836 A | 3/2010 |
| KR | 10-2007-0041235 A | 4/2007 |

OTHER PUBLICATIONS

Choi et al., "Multichannel Random Access in OFDMA Wireless Networks", IEEE Journal on Selected Areas in Communications, vol. 24, No. 3, Mar. 2006, pp. 603-613.

(Continued)

*Primary Examiner* — Un C Cho
*Assistant Examiner* — Natali N Pascual Peguero
(74) *Attorney, Agent, or Firm* — Birch, Stewart, Kolasch & Birch, LLP (57) ABSTRACT

In the present description, a maximum transmission number for preamble and a maximum transmission number uplink message are configured to perform a random access procedure. The maximum transmission number for preamble (e.g., preambleTransMax) can be classified into a first type for general access and a second type for MTC and/or delay-tolerant accesses. Further, the maximum transmission number uplink message (e.g., maxHARQ-Msg3Tx) can be classified into a first type and a second type.

11 Claims, 9 Drawing Sheets

(56) References Cited

OTHER PUBLICATIONS

Tickoo et al., "A Queueing Model for Finite Load IEEE 802.11 Random Access MAC", IEEE Communications Society, vol. 1, Jun. 20-24, 2004, pp. 175-179.

Philips et al., "Control of HARQ for RACH Message 3," 3GPP TSG-RAN WG2#61bis, Agenda Item 5.1.1.10, Tdoc R2-081764, Mar. 31-Apr. 4, 2008, Shenzhen, China, 5 pages.

* cited by examiner

METHOD AND APPARATUS FOR PERFORMING RANDOM ACCESS PROCEDURES IN A WIRELESS COMMUNICATION SYSTEM

CROSS REFERENCE

This application is the National Phase of PCT/KR2011/003082 filed on Apr. 27, 2011, which claims priority under 35 U.S.C. 119(e) to U.S. Provisional Application No. 61/330,388 filed on May 2, 2010 and U.S. Provisional Application No. 61/471,664 filed on Apr. 4, 2011, all of which are hereby expressly incorporated by reference into the present application.

TECHNICAL FIELD

The present invention relates to wireless communications and, more particularly, to a method and apparatus for MTC (Machine-Type Communication) in a wireless communication system.

BACKGROUND ART

MTC (Machine-Type Communication) is a type of data communications including one or more entities not requiring human interaction. Namely, MTC refers to a concept that machines, rather than terminals (or user equipments (UEs)) used by humans, communicate with each other by using an existing wireless communication network. A machine used for MTC may be called an MTC device, and MTC devices include various devices such as a vending machine, a machine measuring a water level of a dam, and the like.

An MTC device has different characteristics from those of a general terminal, so a service optimized for MTC may be different from a service optimized for human-to-human communications. Compared to a current mobile network communication service, MTC may be characterized by mutually different market scenarios, data communication low costs and efforts, a potentially large number of communication terminals, wide service coverage, low traffic per terminal, and the like.

The number of MTC devices supported by a single base station is expected to be much greater than the number of terminals. Due to general M2M (Machine to Machine) service characteristics, communication is highly likely to be simultaneously performed on a plurality of MTC devices.

Thus, there is a possibility that network resources are insufficient, and a technique for effectively handling network signaling loads for MTC devices is required.

DISCLOSURE

Technical Problem

The following examples provide a method and apparatus efficiently controlling the signalling load for MTC features.

Technical Solution

An embodiment of the present invention provides a method and apparatus for MTC (Machine-Type Communication) in a wireless communication system.

The method may include: receiving information on a maximum transmission number for random access preamble transmission from a base station; transmitting a random access preamble to the base station based on the maximum transmission number for random access preamble transmission, wherein the maximum transmission number for random access preamble transmission is classified into a first type maximum transmission number and a second type maximum transmission number.

The method further includes: receiving information on a maximum transmission number for uplink message from the base station; in response to the random access preamble, receiving a random access response from the base station; and in response to the random access response, transmitting the uplink message to the base station based on the maximum transmission number for uplink message; wherein the uplink message is transmitted based on the maximum transmission number for uplink message, wherein the maximum number for uplink message is classified into a third type maximum transmission number and a forth type maximum transmission number.

In the method, the first type maximum transmission number is used for cell-common random access and the second type maximum transmission number is used for cause-specific random access.

In the method, the cause-specific random access is used when an establishment cause specified in a Radio Resource Control (RRC) connection request message is associated with machine type communication (MTC) or low priority access.

In the method, the establishment cause is indicated by a non-access stratum

In the method, the step of transmitting the random access preamble to the base station includes: setting up a counter for the random access preamble; and determining whether to retransmit the random access preamble by using the counter and the maximum transmission number for random access preamble transmission.

In the method, the maximum transmission number for random access preamble transmission is included in one of dedicated signalling of Dedicated Control Channel (DCCH), system information of Broadcast Control Channel (BCCH), and a paging message.

In another aspect, the method includes: transmitting information on a maximum transmission number for random access preamble transmission to a user equipment (UE); and receiving a random access preamble to for the UE, wherein the random access preamble is transmitted by the UE based on the maximum transmission number for random access preamble transmission, wherein the maximum transmission number for random access preamble transmission is classified into a first type maximum transmission number and a second type maximum transmission number.

The method further comprising: transmitting information on a maximum transmission number for uplink message to the UE; in response to the random access preamble, transmitting a random access response to the UE; and in response to the random access response, receiving the uplink message from the UE based on the maximum transmission number for uplink message; wherein the uplink message is received from the UE based on the maximum transmission number for uplink message, wherein the maximum number for uplink message is classified into a third type maximum transmission number and a forth type maximum transmission number.

In the method, the first type maximum transmission number is used for cell-common random access and the second type maximum transmission number is used for cause-specific random access.

In the method, the cause-specific random access is used when an establishment cause specified in a Radio Resource Control (RRC) connection request message is associated with machine type communication (MTC) or low priority access.

In the method, the establishment cause is indicated by a non-access stratum layer.

In the method, the maximum transmission number for random access preamble transmission is included in one of dedicated signalling of Dedicated Control Channel (DCCH), system information of Broadcast Control Channel (BCCH), and a paging message.

Advantageous Effects

In the method and apparatus according to embodiments of the present invention, since a cell-common backoff parameter and a particular cause-dedicated parameter are classified, a delay time according to a random access can be reduced.

MODE FOR INVENTION

Figure 1:
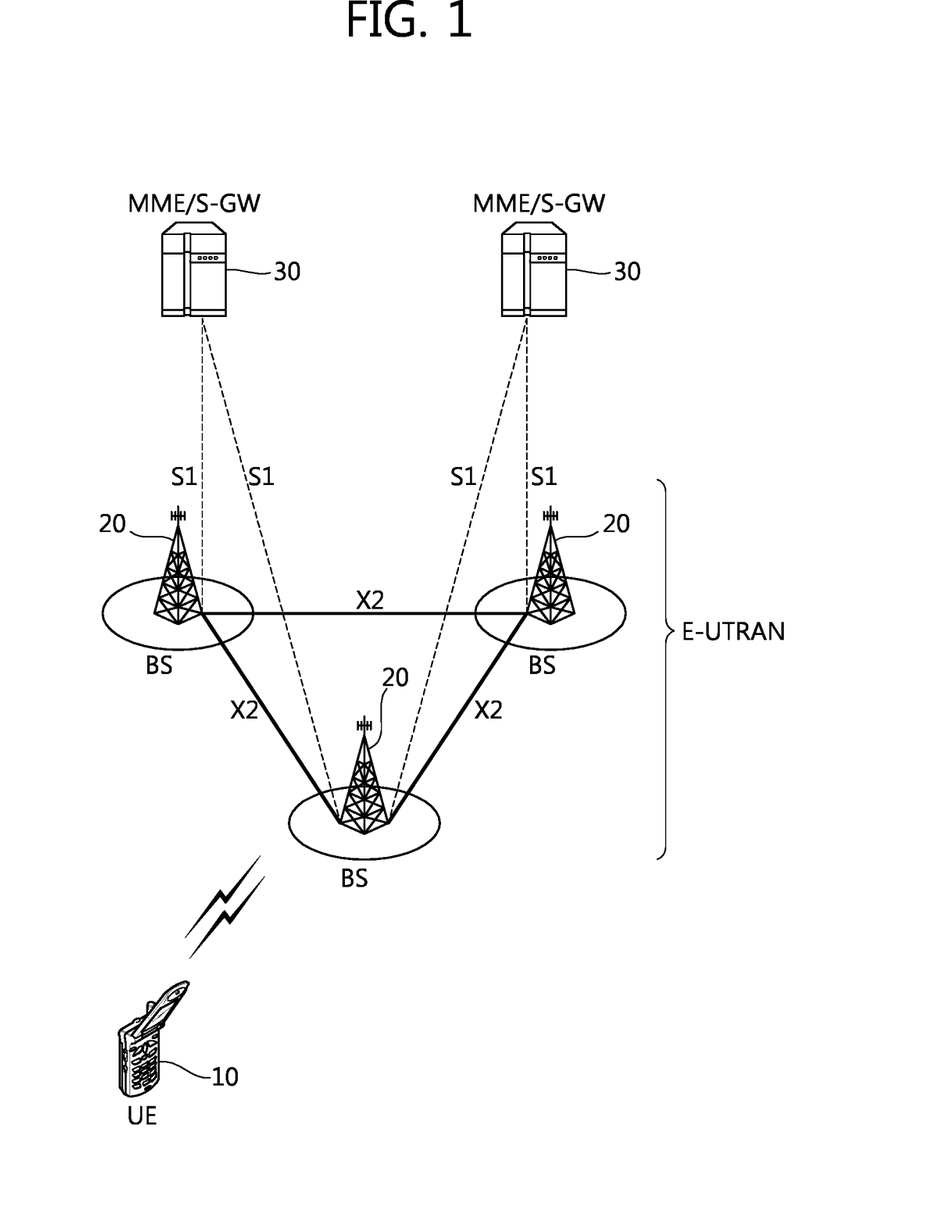
FIG. 1 is a wireless communication system to which an embodiment of the present invention is applied.

FIG. 1 is a wireless communication system to which an embodiment of the present invention is applied. It may be called an E-UTRAN (Evolved-UMTS Terrestrial Radio Access Network), or an LTE (Long Term Evolution)/LTE-A system.

An E-UTRAN includes a base station (BS) 20 that provides a control plane and a user plane to a user equipment (UE) 10. The UE 10 may be fixed or mobile, and may be referred to by other name, such as a mobile station (MS), a user terminal (UT), a subscriber station (SS), a wireless device, or the like. The BS 20 generally refers to a fixed station that communicates with the UE 10 and may be called by other name, such as an eNB (evolved-Node B), a BTS (Base Transceiver System), an access point, or the like.

The BSs 20 may be connected with each other via an X2 interface. The BS 20 is connected to an EPC (Evolved Packet Core) 30 via an S1 interface. Specifically, the BSs 20 are connected to an MME (Mobility Management Entity) via S1-MME and to an S-GW (Serving Gateway) via S1-U.

The EPC 30 includes an MME, an S-GW, and a P-GW (Packet Data Network-Gateway). The MME retains information regarding a UE access or information regarding UE capability, and such information is largely used to manage UE mobility. The S-GW is a gateway having an E-UTRAN as a terminal point and the P-GW is a gateway having a PDN as a terminal point.

A radio interface between a UE and a BS is called a Uu interface. Layers of the radio interface protocols between a UE and a network may be divided into a first layer L1, a second layer L2, and a third layer L3 based on the three lower layers of an open system interconnection (OSI) standard model widely known in communication systems. The physical layer belonging to the first layer (L1) provides an information transfer service using a physical channel, and an RRC (Radio Resource Control) layer positioned in the third layer serves to control radio resources between the UE and the network. To this end, the RRC layer exchanges an RRC message between the UE and the network.

Figure 2:
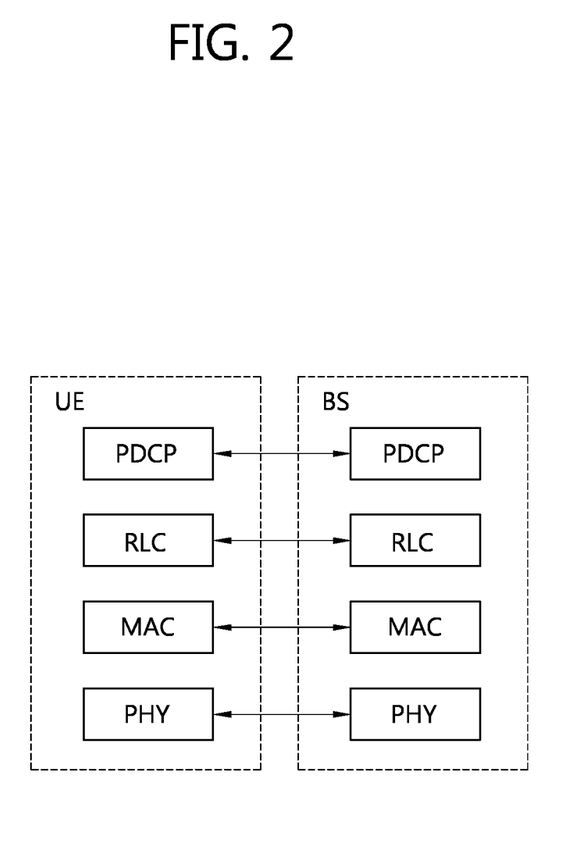
FIG. 2 is a block diagram showing a radio protocol architecture with respect to a user plane.
Figure 3:
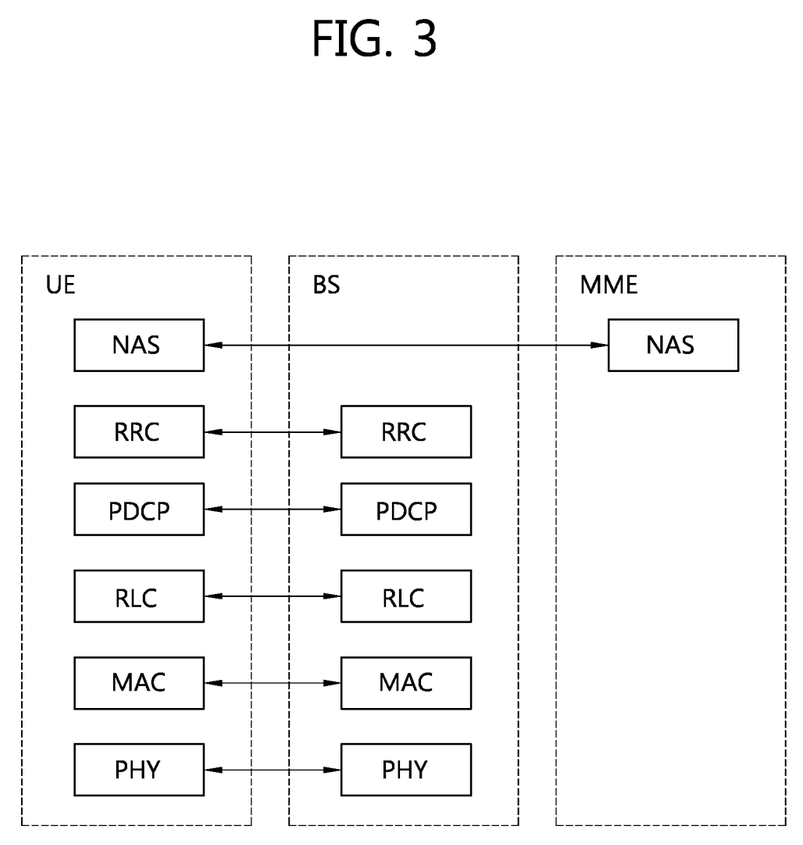
FIG. 3 is a block diagram showing a radio protocol architecture with respect to a control plane.

FIG. 2 is a block diagram showing a radio protocol architecture with respect to a user plane. FIG. 3 is a block diagram showing a radio protocol architecture with respect to a control plane. The user plane is a protocol stack for transmitting user data, and the control plane is a protocol stack for transmitting a control signal.

Referring to FIGS. 2 and 3, the physical layer provides an information transfer service to an upper layer by using a physical channel. The physical layer is connected to a medium access control (MAC) layer via a transport channel. Data is transferred between the MAC layer and the physical layer via the transport channel. Transport channels are classified depending on how and with what kind of characteristics data is transmitted through a radio interface Between different physical layers, namely, between physical layers of a transmitter and a receiver, data is transferred via the physical channel. The physical channel may be modulated according to an OFDM (Orthogonal Frequency Division Multiplexing) scheme, and time and frequency may be utilized as radio resources.

Functions of the MAC layer include mapping between a logical channel and a transport channel and multiplexing/demultiplexing an MAC SDU (service data unit) belonging to a logical channel into a transport block belonging to a physical channel via a transport channel. The MAC layer provides a service to an RLC (radio link control) layer through a logical channel.

Functions of the RLC layer include concatenation, segmentation, and reassembly of an RLC SDU. In order to guarantee various QoS (Quality of Service) required by a radio bearer (RB), the RLC layer provides three types of operation modes: a transparent mode (TM), an unacknowledged mode (UM), and an acknowledged mode (AM). An AM RLC provides an error correction through an ARQ (automatic repeat request).

A PDCP (Packet Data Convergence Protocol) layer in the user plane performs a transfer of a user data, header compression, and ciphering. Functions of the PDCP in the control plane include transfer of control plane data and ciphering/integrity protection.

The RRC (Radio Resource Control) layer is defined only in the control plane. The RRC layer handles controlling of a logical channel, a transport channel, and a physical channel in relation to configuration, re-configuration, and releasing of radio bearers (RBs).

RB refers to a logical path provided by the first layer (PHY layer) and the second layers (MAC layer, RLC layer, and PDCP layer) to transfer data between a UE and a network. Setting of an RF refers to defining characteristics of radio protocol layers and channels and configuring detailed parameters and operation methods to provide a particular service. RBs may be divided into two types: SRB (Signaling RB) and DRB (Data RB). The SRB is used as a passage for transmitting an RRC message on the control plane, and the DRB is used as a passage for transferring an RRC message on the user plane.

When there is an RRC connection between the RRC of the UE and that of the E-UTRAN, the UE is in an RRC-connected mode, or otherwise, the UE is in an RRC idle mode.

Downlink transport channels for transmitting data from the network to the UE includes a BCH (Broadcast Channel) for transmitting system information and a DL-SCH (Downlink-Shared Channel) for transmitting user traffic or a control message. Traffic or a control message of a downlink multicast or broadcast service may be transmitted via the DL-SCH or an extra downlink MCH (Multicast Channel). Meanwhile, uplink transport channels for transmitting data from the UE to the network includes an RACH (Random Access Channel) for transmitting an initial control message and a UL-SCH (Uplink-Shared Channel) for transmitting user traffic or a control message.

Logical channels positioned at a higher level and mapped to a transport channel includes a BCCH (Broadcast Channel), a PCCH (Paging Control Channel), a CCCH (Common Control Channel), an MCCH (Multicast Control Channel), an MTCH (Multicast Traffic Channel), or the like.

A physical channel is comprised of several OFDM symbols in a time domain and several subcarriers in a frequency domain. A single subframe includes a plurality of OFDM symbols in the time domain. A resource bock is a resource allocation unit, which includes a plurality of OFDM symbols and a plurality of subcarriers. Each subframe may use particular subcarriers of particular OFDM symbols (e.g., first OFDM symbol) of a corresponding subframe for a PDCCH (Physical Downlink Control Channel), namely, for an L1/L2 control channel. A TTI (Transmission Time Interval) is a unit time of a subframe transmission.

Hereinafter, an RRC state and an RRC connection method will be described.

An RRC state refers to whether or not an RRC layer of a UE is logically connected to that of the E-UTRAN. When the RRC layer of the UE is logically connected to that of the E-UTRAN, it is called an RRC connected state, and or otherwise, it is called an RRC idle state. When the UE is in the RRC connected state, since the RRC connection exists, the E-UTRAN can recognize the presence of the corresponding UE by cell, and thus, the E-UTRAN can effectively control the UE. Meanwhile, when the UE is in the RRC idle state, the E-UTRAN cannot recognize the UE in the RRC idle state, and the UE is managed by a core network (CN) by track area unit larger than a cell. Namely, the UE in the RRC idle state is recognized as to whether or not it is present by the larger area unit, and in order for the UE in the RRC idle state to receive a general mobile communication service such as a voice or data, the UE in the RRC idle state is to be changed to the RRC connected state.

When the user first turns on power of a UE, the UE first searches for an appropriate cell and remains in an RRC idle state in the corresponding cell. When the UE in the RRC idle state is required to be RRC connected, the UE establishes an RRC connection with the E-UTRAN through an RRC connection procedure and transitions to the RRC connection state. When the UE in the RRC idle state may need to establish an RRC connection for various reasons. For example, the UE in the RRC idle state may establish an RRC connection when a transmission of uplink data is required as the user attempts to make a call, or the like, or when a response is required to be transmitted as a paging message is received from the E-UTRAN.

A NAS (Non-Access Stratum) layer positioned at a higher level of the RRC layer performs functions such as session management, mobility management, and the like.

In order for the NAS layer to manage mobility of the UE, two states of EMM-REGISTERED (EPS Mobility Management-REGISTERED) and EMM-DEREGISTERED are defined, and these two states are applied to a UE and an MME. Initially, the UE is in the EMM-DEREGISTERED state, and in order to access a network, the UE performs a process of registering the corresponding network through an initial attach procedure. When the attach procedure is successfully performed, the UE and the MME are in the EMM-REGISTERED state.

In order to manage a signaling connection between the UE and the EPC, two states of ECM (EPS Connection Management)-IDLE and an ECM-CONNECTED state are defined, and these two states are applied to the UE and the MME. When the UE in the ECM-IDLE state establishes an RRC connection with the E-UTRAN, the corresponding UE is in the ECM-CONNECTED state. When the MME in the ECM-IDLE state establishes an S1 connection with the E-UTRAN, the MME is in an ECM-CONNECTED state. When the UE is in the ECM-IDLE state, the E-UTRAN does not have information regarding context of the UE. Thus, the UE in the ECM-IDLE state performs a UE-based mobility related procedure such as cell selection or cell reselection without receiving a command of the network. Meanwhile, when the UE is in the ECM-CONNECTED state, mobility of the UE is managed by a command of the network. In the ECM-IDLE state, when a location of the UE is changed to be different from that known by the network, the UE informs the network about its location through a tracking area updating procedure.

Hereinafter, system information will be described. System information includes essential information for the UE to know in order to access a BS. Thus, the UE should receive all the system information before accessing a BS, and also, the UE should retain the latest system information all the time. Since system information is information every UE within a cell should know, the BS periodically transmits system information to UEs.

System information is divided into an MIB (Master Information Block), an SB (Scheduling Block), an SIB (System Information Block), and the like. The MIB allows the UE to know a physical configuration, e.g., a bandwidth, of a corresponding cell. The SB provides transmission information of SIBs, e.g., a transmission period, and the like. The SIB is a set of relevant system information. For example, a certain SIB includes only information regarding a neighboring cell, while a certain SIB includes only information regarding an uplink radio channel.

In order to inform the UE about whether or not system information has been changed, a BS transmits a paging message. In this case, the paging message includes a system information change indicator. The UE receives the paging message according to Paging DRX, and if the paging message includes the system information change indicator, the UE receives system information transmitted through a logical channel BCCH.

In an LTE system, a noncontention random access procedure allocating, by a BS, a designated (or dedicated) random access preamble to a particular UE and randomly accessing, by the UE, with the random access preamble is provided. In other words, the procedure of selecting a random access preamble includes a contention-based random access procedure that a UE randomly selects one random access preamble from a particular set and uses the same and a noncontention-based random access procedure that a UE uses a random access preamble allocated thereto. A difference between the two random access procedures lies in a generation of collision due to contention as described hereinafter. The noncontention-based random access procedure may6 be used only when the foregoing handover process is performed or when it is requested by a command from a BS.

Figure 4:
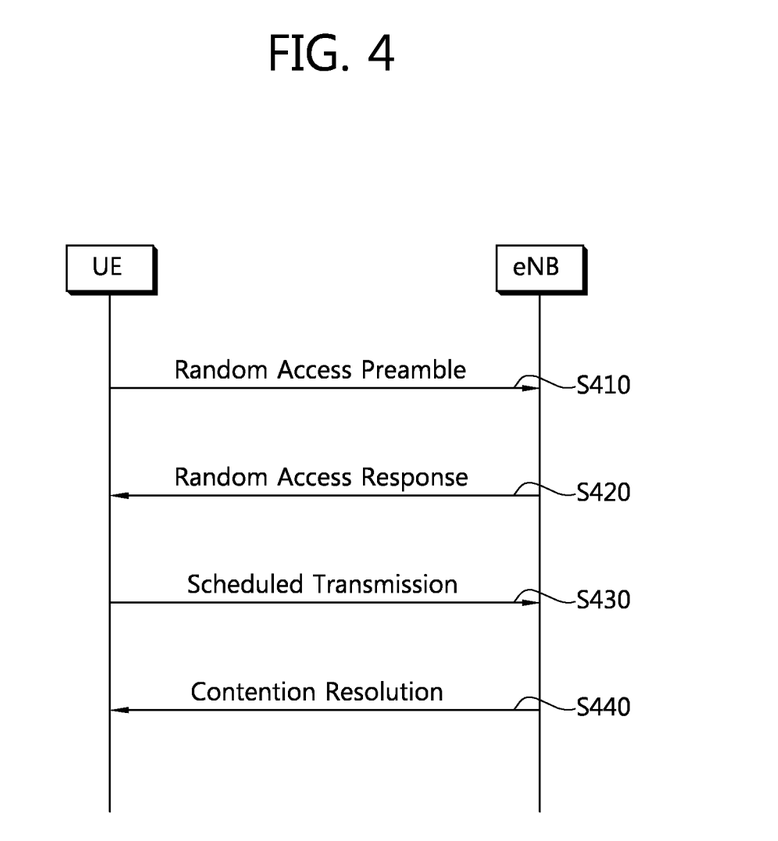
FIG. 4 is a view illustrating an operation process of a user equipment (UE) and a base station (BS) in a contention-based random access procedure.

FIG. 4 is a view illustrating an operation process of a UE and a base station in a contention-based random access procedure.

Step S410 will be described. In the contention-based random access, a UE randomly selects one random access from a set of random access preambles indicated by system information or a handover command, selects a PRACH resource able to transmit the random access preamble, and transmits the same.

Step S420 will be described below. After the random access preamble is transmitted, the UE attempts to receive a random access response thereof within a random access response reception window indicated by the system information or the handover command. In detail, the random access response information is transmitted in the form of a MAC PDU, and the MAC PDU is transferred on a PDSCH. In order to allow the UE to properly receive the information transmitted on the PDSCH, a PDCCH is also transferred together. Namely, the PDCCH includes information regarding a UE which is to receive the PDSCH, frequency and time information of radio resource of the PDSCH, a transmission format of the PDSCH, and the like. When the UE successfully receives the PDCCH destined therefor, the UE appropriately receives the random access response transmitted on the PDSCH according to the information items of the PDCCH. The random access response includes a random access preamble identifier (ID), a UL Grant (uplink radio resource), a temporary C-RNTI, and a time alignment command (TAC). In the above, the reason why the random access preamble identifier is required is because, since a single random access response may include random access response information for one or more UEs, so the random access preamble identifier informs for which UE the UL Grant, Temporary C-RNTI, and TAC are valid. The random access preamble identifier is identical to a random access preamble selected by the UE in Step S410.

Step S430 will be described. When the UE receives the random access response valid therefor, the UE processes the information items included in the random access response. Namely, the UE applies the TAC and stores the Temporary C-RNTI. Also, the UE transmits data stored in a buffer thereof or newly generated data to the BS by using the UL Grant. In this case, an identifier of the UE should be included in the data included in the UL Grant. The reason is because, in the contention-based random access procedure, the BS cannot determine which UEs perform the random access procedure, so in order to resolve collision later, the BS should identify UEs. Also, there are two types of methods for including an identifier of the UE. A first method is that when the UE has a valid cell identifier already allocated in the corresponding cell before the random access procedure, the UE transmits its cell identifier through the UL Grant. Meanwhile, when the UE has not been allocated a valid cell identifier before the random access procedure, the UE includes its unique identifier (e.g., an S-TMSI or a random ID) in data and transmits the same. In general, the unique identifier is longer than a cell identifier. When the UE transmits the data through the UL Grant, the UE starts a contention resolution timer.

Step S440 will be described. After the UE transmits the data including its identifier through the UL Grant included in the random access response, the UE waits for an instruction from the BS for a collision resolution. Namely, in order to receive a particular message, the UE attempts to receive a PDCCH. There are two methods for receiving a PDCCH. As mentioned above, when the identifier of the UE transmitted through the UL Grant is a cell identifier, the UE attempts to receive a PDCCH by using its cell identifier, and when the identifier is a unique identifier, the UE attempts to receive a PDCCH by using the Temporary C-RNTI included in the random access response. Thereafter, in the former case, when a PDCCH is received through its cell identifier before the contention resolution timer expires, the UE determines that the random access procedure has been normally performed, and terminates the random access procedure. In the latter case, when the UE receives a PDCCH through the Temporary cell identifier before the contention resolution time expires, the UE checks data transferred by the PDSCH indicated by the PDCCH. When the data content includes its unique identifier, the UE determines that the random access procedure has been normally performed, and terminates the random access procedure.

Figure 5:
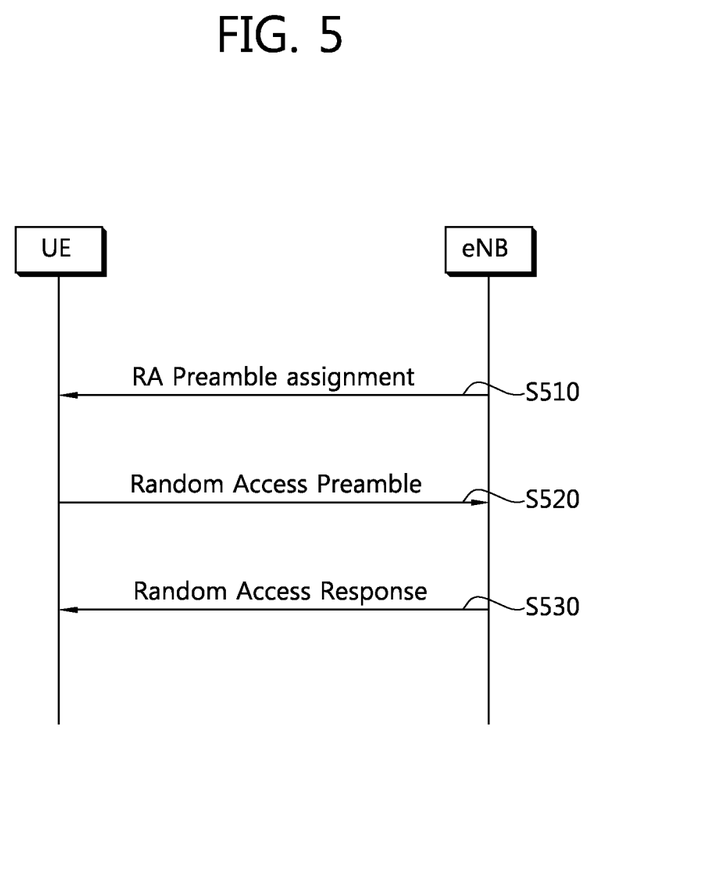
FIG. 5 is a view illustrating an operation process of a UE and a base station in a noncontention-based random access procedure.

FIG. 5 is a view illustrating an operation process of a UE and that a base station in a noncontention-based random access procedure. Additionally, in comparison to the contention-based random access procedure, in the noncontention-based random access procedure, upon receiving random access response information, it is determined that a random access procedure has been normally performed, and the random access procedure is terminated.

Step S510 will be described. As mentioned above, the noncontention-based random access procedure may exist, first, in the case of a handover process, and second, in the case of being requested by a command from a BS. Of course, in the two cases, the contention-based random access procedure may be performed. First, for the noncontention-based random access procedure, it is important to receive a designated random access preamble eliminating a possibility of collision. A method of receiving an indication of the random access preamble includes a handover command and a PDCCH command.

Step S520 will be described. After receiving the allocated random access preamble designated only for the UE, the UE transmits the preamble to the BS.

Step S530 will be described. A method of receiving random access response information is the same as that in the contention-based random access procedure.

A detailed method for collision resolution in a random access procedure will be described.

The reason why a collision occurs in a random access procedure is, basically, because the number of random access preambles is limited. Namely, the BS cannot provide a UE-specific random access preamble to every UE, so the UE randomly select one of the common random access preambles and transmits it. Thus, it may happen that two or more UEs select the same random access preamble and transmits the same through the same PRACH resource, but the BS determines that the random access preamble transmitted by the one or more UEs as a single random access preamble transmitted from one UE. Thus, the BS transmits a random access response to the UE, and predicts that the one UE will receive it. However, a collision may occur as described above, so two or more UEs receive one random access response, and accordingly, each UE performs an operation according to the reception of the random access response. Namely, a problem arises in that two or more UEs transmit different data on the same resource by using the single UL Grant included in the random access response. Thus, all the data transmissions may fail, or the BS may receive only data of a particular UE according to locations or transmission power of the UEs. In the latter case, all the two or more UEs assume that their data transmission has been successful, so the BS should provide information regarding a failure to the UEs which have failed in the contention. Namely, providing information regarding a failure or a success in the contention is called contention resolution. There are two contention resolution methods. One method is using a contention resolution (CR) timer and the other is transmitting an identifier of a successful UE to the UEs. The former case is used when the UE already has a unique cell identifier (C-RNTI) before the random access procedure. Namely, the UE which already has a cell identifier transmits data including its cell identifier to the BS according to a random access response, and operates a CR timer. And, when PDCCH information including its cell identifier is received before the CR timer expires, the UE determines that the UE itself has been successful in the contention, and normally terminates the random access procedure. Reversely, when the UE fails to receive the PDCCH including its cell identifier before the CR timer expires, the UE determines that it has failed in the contention, and re-performs the random access procedure or informs a higher layer about the failure. In the latter case of the CR methods, namely, the method of transmitting the identifier of the successful UE is used when the UE does not have a unique cell identifier before the random access procedure. Namely, when the UE itself does not have a cell identifier, the UE includes a higher identifier (S-TMSI or random ID) than a cell identifier in data according to UL Grant information included in the random access response and transmits the same and operates the CR timer. When data including its higher identifier is transmitted on a DL-SCH before the CR timer expires, the UE determines that the random access procedure has been successful. Meanwhile, when the UE fails to receive data including its higher identifier on a DL-SCH before the CR timer expires, the UE determines that the random access procedure has failed.

Hereinafter, machine type communication (MTC) will be described. MTC is also called object-to-object intelligent network (or O2N).

MTC refers to communication between machines without a human intervention, and a UE used in MTC is an MTC device. MTC is also called by other name such as M2M (Machine to Machine). A service provided through MTC is different from a service in existing communications intervened by a person, and various categories of services exist as follows. For example, service such as tracking, metering, a payment system, medicine (or healthcare), remote controlling, and the like, are provided through MTC.

Figure 6:
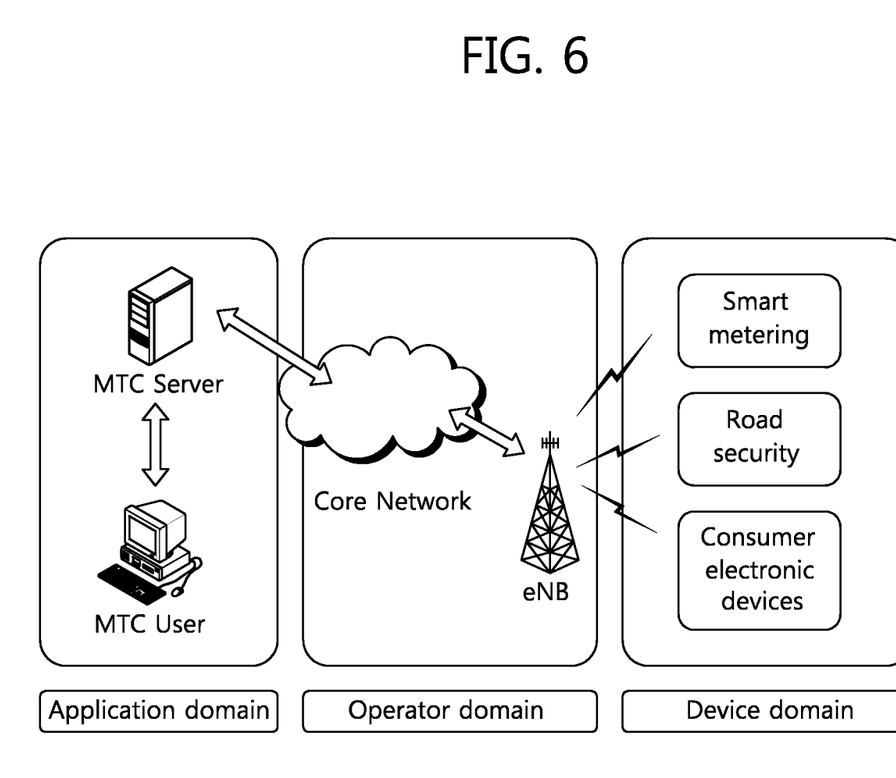
FIG. 6 is a view illustrating a communication system including MTC (Machine-Type Communication).

FIG. 6 is a view illustrating a communication system including MTC (Machine-Type Communication). An MTC device communicates with a different MTC device or an MTC server through a mobile communication network (PLMN). The MTC server may provide services such as metering, road information, user's controlling of electronic device, and the like, to an MTC user.

In order to effectively support the MTC service, characteristics such as low mobility, time tolerance, small data transmission, and the like, may be considered. Also, it may be assumed that numerous MTC devices may exist in a single cell.

On the assumption that numerous MTC devices exist in a single cell, a scenario that numerous MTC devices perform random access in a particular situation may be assumed. When numerous MTC devices perform random access, a system load is increased. Namely, the plurality of MTC devices may transmit backoff to delay a random access re-transmission.

In the following examples, a maximum number for preamble transmission can be classified into a first maximum number for cell-common random access and a second maximum number for cause-dedicated (or causes-specific) random access. Further, a maximum number for Message 3 (i.e., a message transmitted in response to a random access response) transmission can be classified into a first maximum number for cell-common random access and a second maximum number for cause-dedicated (or causes-specific) random access.

In detail, a UE based on the following examples receives a cell-common random access transmission maximum number and a cause-dedicated (i.e., cause-specific) random access transmission maximum number. When performing cause-dedicated (i.e., cause-specific) random access, the cause-dedicated random access transmission maximum number is used. Otherwise, a random access preamble is transmitted based on the cell-common random access transmission maximum number.

A UE based on the following examples retransmits the random access preamble whenever it fails to receive a positive response. If the number of random access preamble reaches a pre-defined maximum number, a failure of random access is declared.

Once the UE receives a positive response, a uplink message (e.g., 'Message 3' transmitted via UL-SCH) is transmitted. If a negative response to the uplink message is received, the UE retransmits the uplink message. When retransmitting the uplink message, the retransmission is repeated until a pre-defined maximum transmission number.

If UEs perform access according to MTC, Delay Tolerant Access, or low priority access, cause-specific random access is performed.

Figure 7:
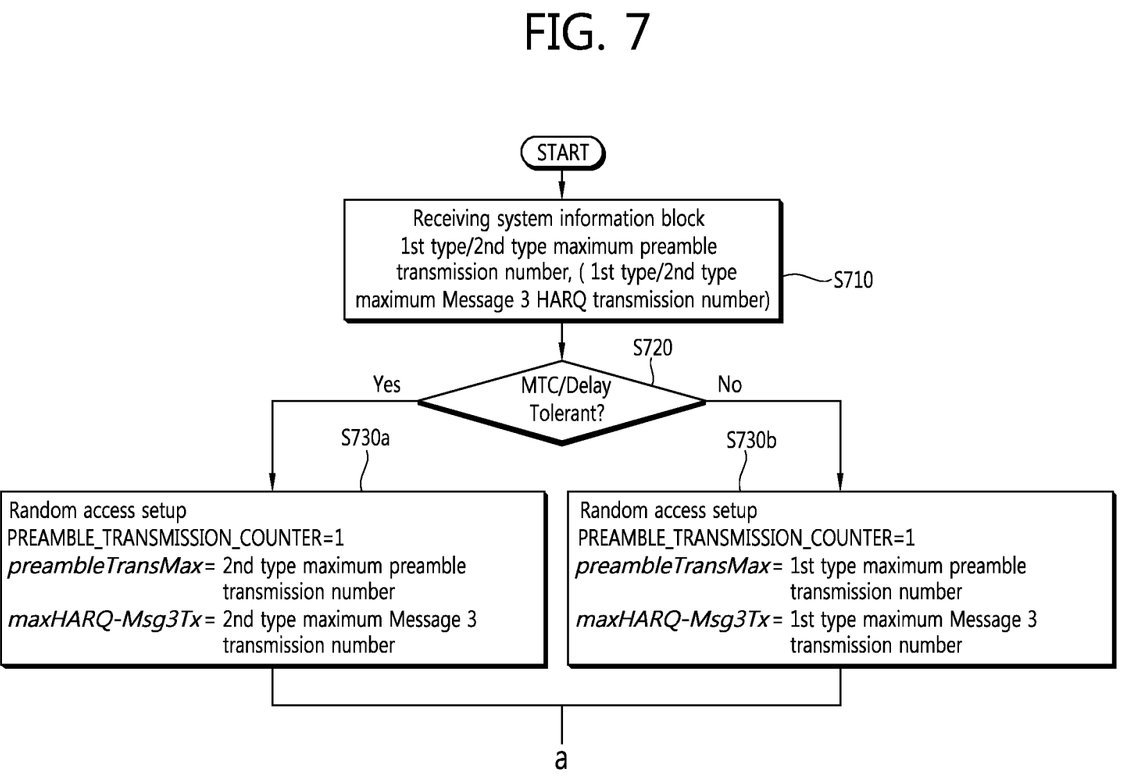
FIG. 7 is a view illustrating an example of random access performed in a MAC layer of UEs.
Figure 8:
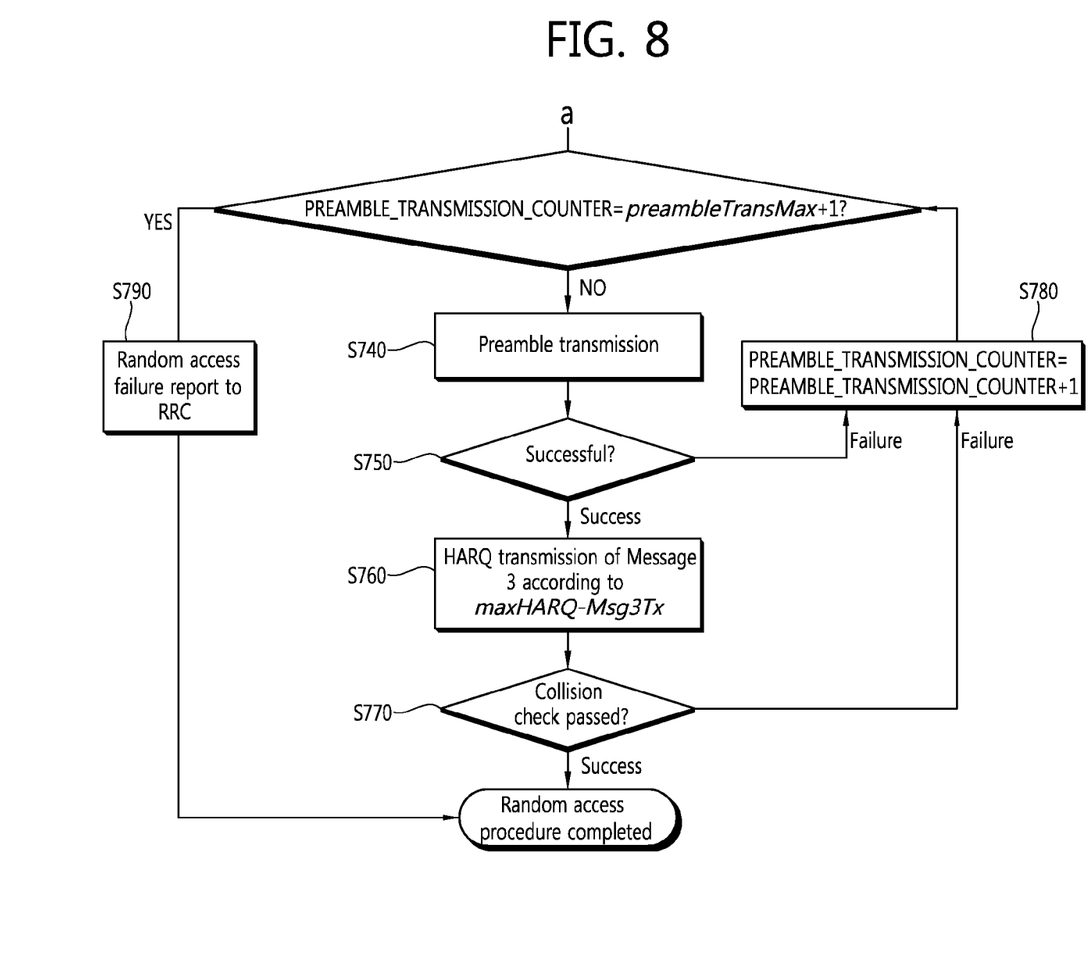
FIG. 8 is a view illustrating an example of random access performed in a MAC layer of UEs.

FIG. 7 and FIG. 8 are examples of performing random access in a MAC layer of UE.

Hereinafter, Step S710 is explained. UE receives system information and obtains configuration information for random access. The configuration information for random access includes a maximum transmission number for cell-common random access, a maximum transmission number for cause-specific (i.e., cause-dedicated) random access, a maximum transmission number for cell-common Message 3 HARQ operation, and a maximum transmission number for causes-specific Message 3 HARQ operation. Namely, respective maximum preamble transmission numbers can be classified into a first type (cell-common preamble transmission) and a second type (cause-specific preamble transmission). Further, respective maximum Message 3 HARQ transmission numbers can be classified into a first type (cell-common Message 3 HARQ transmission) and a second type (cause-specific Message 3 HARQ transmission). Hereinafter, the maximum preamble transmission number is referred to as "preambleTransMax" and the maximum Message 3 HARQ transmission number is referred to as "maxHARQ-Msg3Tx."

Hereinafter, Step S720 is explained. If UE performs random access for MTC/delay tolerant access, a second type maximum transmission number is stored. Otherwise, a first type maximum transmission number is stored.

Hereinafter, Step S730a is explained. If UE performs random access for MTC/delay tolerant access, relevant parameters are configured as follows:
PREAMBLE_TRANSMISSION_COUNTER=1
preambleTransMax=second type maximum preamble transmission number
maxHARQ-Msg3Tx=second type maximum 'Message 3' HARQ transmission number Hereinafter, Step S730b is explained. If UE does not perform random access for MTC/delay tolerant access (i.e., conventional H2H access), relevant parameters are configured as follows:

PREAMBLE_TRANSMISSION_COUNTER=1 preambleTransMax=first type maximum preamble transmission number maxHARQ-Msg3Tx=first type maximum 'Message 3' HARQ transmission number Hereinafter, Step S740 is explained. UE transmits randomly-selected RAPID (Random Access Preamble ID), which is included in a random access preamble.

Hereinafter, Step S750 is explained. If UE does not receive a random access response including the RAPID during a random access reception window, the UE determines that the preamble transmission has been failed. If the UE receives random access response including the RAPID during the random access reception window, the UE determines that the preamble transmission has been succeeded.

Hereinafter, Step S760 is explained. Once the preamble transmission is successful, the UE transmits Message 3 via the Uplink shared channel. If the Message 3 is a RRC connection request message, the UE configures an establishment cause (i.e., RRC establishment cause) as indicated by a NAS layer. For instance, if the NAS layer indicates MTC, the RRC establishment cause is set to as MTC (or MTC access). Further, if the NAS layer indicates lower priority access, the RRC establishment cause is set to as lower priority access (or MTC access). If the UE receives HARQ ACK, the Message 3 is not retransmitted. However, upon reception of HARQ NACK, the Message 3 is retransmitted. Such retransmission can be repeated until a predefined maxHARQ-Msg3Tx. If the number of retransmission reaches the predefined maxHARQ-Msg3Tx, the retransmission can be terminated.

Hereinafter, Step S770 is explained. When transmitting the Message 3, UE can initiate (or start) a contention resolution timer (CR timer) until am expiration time of the CR timer. If a CR message corresponding to the Message 3 has been received until the expiration of the CR timer, the contention is resolved and the random access procedure is successfully completed. Otherwise, the UE determines that collision occurs.

Hereinafter, Step S780 is explained. In case of failure of preamble transmission and/or in case of collision, relevant parameters are configured as follows:

PREAMBLE_TRANSMISSION_COUNTER=PREAMBLE_
TRANSMISSION_COUNTER+1

If 'PREAMBLE_TRANSMISSION_COUNTER=preamble TransMax+1' is true, a MAC layer of the UE informs of its RRC layer the failure of random access. Thereafter, the RRC layer reports the failure of random access to its base station (e.g., cell).

If 'PREAMBLE_TRANSMISSION_COUNTER=preamble TransMax+1' is not true, the UE starts again from Step S740.

Base on the above description, the maximum preamble transmission number (e.g., preambleTransMax) is classified into a first type for general uses and a second type for MTC/delay tolerant access. Further, the maximum uplink message transmission number (e.g., maxHARQ-Msg3Tx) is also classified into the first type and the second type.

Figure 9:
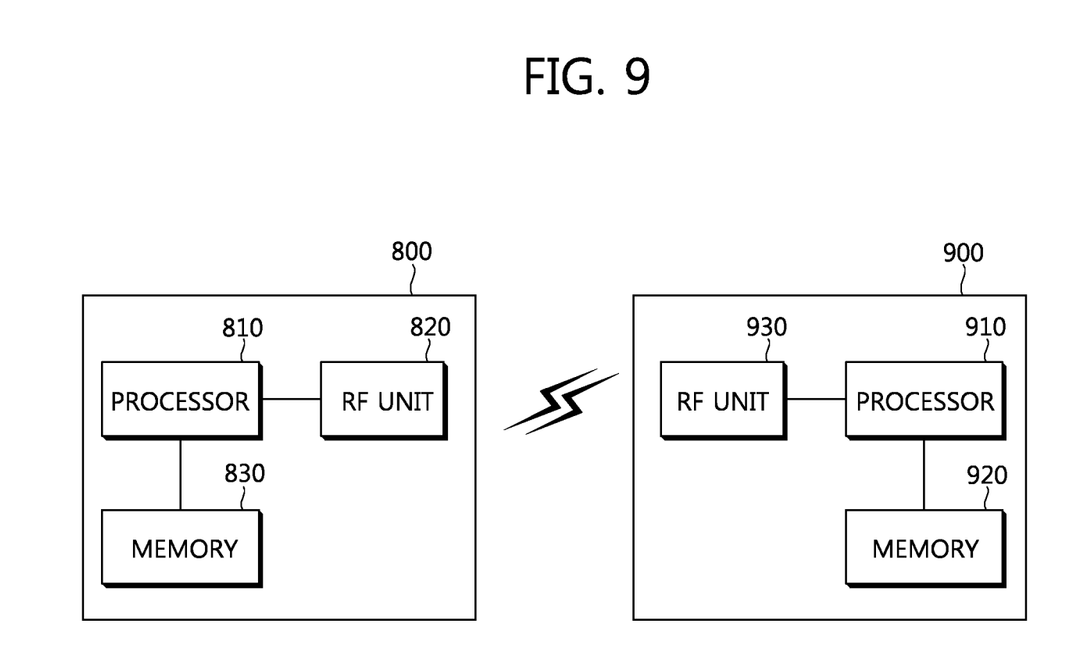
FIG. 9 is a view illustrating a user equipment (UE) and a base station (BS) to which an embodiment of the present invention is applied.

FIG. 9 is a view illustrating a UE and a BS to which an embodiment of the present invention is applied. A UE 1000 includes a processor 810, a memory 830, and a radio frequency (RF) unit 820. The processor 810 may allocate radio resources according to information provided from the outside, information previously stored therein, and the like. Procedures, techniques, and functions performed by the UE in the foregoing embodiments may be implemented by the processor 810. The memory 830, connected to the processor 810, stores various types of information for driving the processor 810. The RF unit 820, connected to processor 810, transmits and/or receives radio signals.

A BS 900 communicating with the UE includes a processor 910, a memory 920, and a radio frequency (RF) unit 930. Procedures, techniques, and functions performed by the BS in the foregoing embodiments may be implemented by the processor 910. The memory 920, connected to the processor 910, stores various types of information for driving the processor 910. The RF unit 930, connected to processor 910, transmits and/or receives radio signals.

The processors 810 and 910 may include an ASIC (Application-Specific Integrated Circuit), a chip-chip, a logical circuit and/or a data processor. The memories 830 and 920 may include a ROM (Read-Only Memory), a RAM (Random Access Memory), a flash memory, a memory card, a storage medium, and/or any other storage devices. The RF units 820 and 930 may include a baseband circuit for processing a radio signal. When the embodiments are implemented by software, the foregoing techniques may be implemented by modules (processes, functions, or the like) performing the foregoing functions. The modules may be stored in the memories 830 and 920 and executed by the processors 810 and the processor 910, respectively. The memories 830 and 920 may be provided within or outside the processors 810 and 910 and may be connected to the processors 810 and 910 through a well-known unit, respectively.

The method and apparatus as described above may be implemented by hardware, software, or a combination thereof. For hardware implementation, the method and apparatus as described above may be implemented by using application specific integrated circuits (ASICs), digital signal processors (DSPs), programmable logic devices (PLDs), field programmable gate arrays (FPGAs), processors, controllers, microprocessors, electronic units, or a combination thereof, designed to perform the foregoing functions. For software implementation, the method and apparatus as described above may be implemented by a module performing the foregoing functions. Software may be stored in a memory unit and executed by a processor. As the memory unit or the processor, various means well known to a person skilled in the art may be employed.

While the present invention has been shown and described in connection with the embodiments, it will be apparent to those skilled in the art that modifications and variations can be made without departing from the spirit and scope of the invention as defined by the appended claims.

The invention claimed is:

1. A method of performing random access in a wireless communication system, the method performed by a user equipment (UE) and comprising:

receiving information on a first type maximum transmission number and a second type maximum transmission number for random access preamble transmission from a base station, wherein the first type maximum transmission number is used for cell-common random access and the second type maximum transmission number is used for cause-specific random access;

selecting one of the first type maximum transmission number and the second type maximum transmission number;

setting parameters related to a random access procedure based on the selected maximum transmission number for a random access preamble transmission; and transmitting a random access preamble to the base station based on the set parameters.

2. The method of claim 1, further comprising:
receiving information on a maximum transmission number for uplink message from the base station;
in response to the random access preamble, receiving a random access response from the base station; and
in response to the random access response, transmitting the uplink message to the base station based on the maximum transmission number for uplink message;
wherein the uplink message is transmitted based on the maximum transmission number for uplink message,
wherein the maximum transmission number for uplink message is classified into a third type maximum transmission number and a forth type maximum transmission number.

3. The method of claim 1,
wherein the cause-specific random access is used when an establishment cause specified in a Radio Resource Control (RRC) connection request message is associated with machine type communication (MTC) or low priority access.

4. The method of claim 3, wherein the establishment cause is indicated by a non-access stratum layer.

5. The method of claim 1, wherein the step of transmitting the random access preamble to the base station includes:
setting up a counter for the random access preamble; and
determining whether to retransmit the random access preamble by using the counter and the maximum transmission number for random access preamble transmission.

6. The method of claim 1, wherein at least one of the first type and second type maximum transmission numbers for random access preamble transmission is included in one of dedicated signalling of Dedicated Control Channel (DCCH), system information of Broadcast Control Channel (BCCH), and a paging message.

7. A method of performing random access in a wireless communication system, the method performed by a base station and comprising:
transmitting information on a first type maximum transmission number and a second type maximum transmission number for random access preamble transmission to a user equipment (UE) such that the UE selects one of the first type maximum transmission number and the second type maximum transmission number and then sets parameters related to a random access procedure based on the selected maximum transmission number for a random access preamble transmission, wherein the first type maximum transmission number is used for cell-common random access and the second type maximum transmission number is used for cause-specific random access; and
receiving a random access preamble from the UE, wherein the random access preamble is transmitted by the UE based on the set parameters.

8. The method of claim 7, further comprising:
transmitting information on a maximum transmission number for uplink message to the UE;
in response to the random access preamble, transmitting a random access response to the UE; and
in response to the random access response, receiving the uplink message from the UE based on the maximum transmission number for uplink message;
wherein the uplink message is received from the UE based on the maximum transmission number for uplink message,
wherein the maximum number for uplink message is classified into a third type maximum transmission number and a forth type maximum transmission number.

9. The method of claim 7, wherein the cause-specific random access is used when an establishment cause specified in a Radio Resource Control (RRC) connection request message is associated with machine type communication (MTC) or low priority access.

10. The method of claim 9, wherein the establishment cause is indicated by a non-access stratum layer.

11. The method of claim 7, wherein at least one of the first type and second type maximum transmission numbers for random access preamble transmission is included in one of dedicated signalling of Dedicated Control Channel (DCCH), system information of Broadcast Control Channel (BCCH), and a paging message.

* * * * *